3,737,534
COCCIDIOSTATIC AND GROWTH PROMOTING
COMPOSITIONS
Hans Thommen, 29 Dahlienstrasse, Therwil, Switzerland, and Harald Weiser, 5 Dornhagliweg, Arlesheim, Switzerland
No Drawing. Continuation-in-part of application Ser. No. 612,089, Jan. 27, 1967. This application Dec. 11, 1969, Ser. No. 884,332
Int. Cl. A01n 9/16, 9/22
U.S. Cl. 424—229           3 Claims

ABSTRACT OF THE DISCLOSURE

Composition containing (a) a therapeutically active sulfonamide and (b) a pyrimidine and the use of such composition as a coccidiostat and/or as a growth promoting agent.

RELATED APPLICATIONS

This application is a continuation-in-part of U.S. patent application Ser. No. 612,089, filed Jan. 27, 1967, now abandoned.

BRIEF SUMMARY OF INVENTION

The invention provides compositions which contain, as the active ingredients, (1) 5-methyl-3-sulfanilamidoisoxazole, or a salt thereof with a pharmaceutically acceptable base, and (2) 2,4-diamino-5-(3,4-dimethoxybenzyl)-pyrimidine, or a salt thereof with a pharmaceutically acceptable acid.

When administered to poultry, these compositions serve a dual purpose. When the composition is fed to poultry as a regular part of its diet, the rate of growth of the birds is greatly promoted. Moreover, when so fed the composition serves to prevent, or at least alleviate the symptoms of coccidiosis, the infection caused by the protozoa of the genus Eimeria, for example, *Eimeria tenella*. Additionally, the composition can be administered, in therapeutically effective amounts, to treat poultry already afflicted with coccidiosis.

DETAILED DESCRIPTION

In raising poultry for human consumption, a main objective is to achieve an optimum growth rate. The poultry should be brought to optimum size in a minimum period of time, minimizing the amount of feed required to accomplish this by maximizing its utilization. At the present time, poultry are raised in rather large size flocks. It is impossible, therefore, to supervise and promote the development of the birds on an individual basis. To be successful, any growth promoting technique must be utilizable on a flock-wide basis.

Many factors serve to restrict or retard the growth of poultry. For obvious reasons, any disturbance which prolongs the time needed to bring a flock of poultry to required size is disadvantageous. For one thing, the cost of raising the birds is increased and, ultimately, this increase must be adsorbed by the consumer. Additionally, the quality of the meat obtained from poultry whose growth has been retarded is quite often inferior to that of poultry which has exhibited a regular pattern of growth. The meat obtained from such poultry is, for example, less solid and less tasty. Finally, prolongation of the raising period increases the risk that the flock, or part thereof, will be lost through exogenous factors, for example, infections.

One of the most disabling diseases which is encountered in raising poultry is coccidiosis, an infection caused by protozoa of the genus Eimeria, such as, for example, *Eimeria tenella*. Coccidiosis quite often proves to be fatal to the animals.

The present invention serves a two-fold function. First of all, it provides a composition which, when fed regularly, promotes the growth of poultry and prevents, or at least minimizes the risk of, coccidiosis. Secondly, the invention provides a composition which can be used in treating poultry already infected with coccidiosis.

The compositions of this invention contain, as the active ingredients thereof, (a) 5-methyl-3-sulfaniliamidoisoxazole or a salt thereof with a pharmaceutically acceptable base and (b) 2,4-diamino-5-(3,4-dimethoxybenzyl)-pyrimidine or a salt thereof with a pharmaceutically acceptable acid. While any pharmaceutically acceptable salt may be utilized in the practice of the invention, alkali metal salts of 5-methyl-3-sulfanilamidoisoxazole are especially preferred. These include, for example, the sodium salt of 5-methyl-3-sulfanilamidoisoxazole, the potassium salt of 5-methyl-3-sulfanilamidoisoxazole, and the like. Furthermore, a salt of 2,4-diamino-5-(3,4-dimethoxybenzyl)-pyrimidine with any pharmaceutically acceptable acid can be used. Such acids include, mineral acids such as, for example, hydrochloric acid, sulfuric acid, and the like and organic acids, such as, acetic acid, citric acid, lactic acid, maleic acid, salicylic acid, and the like. As described hereinafter, for best results in certain embodiments of the invention the active ingredients should be employed in the form of their pharmaceutically acceptable salts.

The compositions of the invention are readily produced. The preparative method involves only the steps of charging the active ingredients into some suitable vessel and thoroughly mixing same therein. The quantities of the active ingredients used in producing the present compositions are variable within certain limits. Thus, for example, this invention embraces compositions which contain from about 50% to about 98% by weight of 5-methyl-3-sulfanilamidoisoxazole, or a salt thereof, and from about 2% to about 50% by weight of 2,4-diamino-5-(3,4-dimethoxybenzyl)-pyrimidine, or a salt thereof. The preferred compositions of the invention, however, contain from about 70% to about 90% by weight of 5-methyl-3-sulfanilamidoisoxazole, or a pharmaceutically acceptable salt thereof, and from about 10% to about 30% of 2,4-diamino-5-(3,4-dimethoxybenzyl)-pyrimidine, or a pharmaceutically acceptable salt thereof.

It will be readily appreciated that the present invention can be carried out in various ways. For example, the compositions can be formulated, as described heretofore, by mixing the active ingredients in the absence of other materials. The composition, thus produced, can thereafter be incorporated, at appropriate dosage levels, into a non-toxic diluent therefor, e.g. the poultry feed, either liquid or solid, or the drinking water supply of the poultry. Additionally, the composition of the invention can be mixed with carriers, such as, cereal grains, by-products of the milling industry, ground oil cakes, distillation residues of the fermentation industry, finely divided mineral materials, ground oyster shells, silicon dioxide, in the presence or absence of oils, antioxidants, and surface-active agents, to provide pre-mixes which, prior to feeding, are further diluted with the basic poultry feed. Generally, the active ingredients, in combination, will comprise from about 5% to about 95% by weight, and preferably from about 10% to about 25% by weight, of the weight of the premix.

In the alternative, the compositions of this invention can be produced in situ by adding the active ingredients separately to the non-toxic diluent, i.e., to a liquid or a solid poultry feed or to the poultry water supply. Similarly, a premix can be prepared by charging the active ingredients separately into the carrier, or carrier mixture, and, by thorough mixing, uniformly distributing same throughout.

The manner in which the compositions of this invention are incorporated into the feed, water, etc., which will be made available to the poultry, is not critical. For example, the compositions, pre-formed, or the active ingredients, can be mixed or ground with the feed or the premix carrier material. In the alternative, the composition, or the active components thereof, can be sprayed on the feed or carrier material in the form of a dilute aqueous solution. In the form of the free base, each of the active ingredients used in the practice of this invention are highly insoluble in water. Thus, where the compositions, or the separate ingredients thereof, are applied to the feed or premix carrier material by spraying, the active ingredients are provided in the form of pharmaceutically acceptable water-soluble salts. In the case of 5-methyl-3-sulfanilamidoisoxazole, an alkali metal salt, for example, the sodium or potassium salt, is preferably employed. In the case of 2,4-diamino-5-(3,4-dimethoxybenzyl)-pyrimidine, an acid addition salt such as, for example, the hydrochloride, sulfate, acetate or citrate, is conveniently used. Similarly, where the composition, or the active ingredients thereof separately, is added to the poultry's drinking water supply, the active ingredients are provided in the form of a pharmaceutically acceptable water-soluble salt. Where pharmaceutically acceptable salts of the active ingredients of the novel compositions of the present invention are employed, a sufficient amount of such salts is utilized to supply the desired quantity of free base. In the alternative, the less soluble bases can be used in the form of an aqueous dispersion. In producting such dispersions conventional dispersing agents are use. Especially well suited for use as the dispersing agents are non-ionic compounds such as, for example, polyoxyethylene sorbitan monooleate, polyoxyethylene monolaurate, polyoxyethylene ricinoleate and the like.

In the practice of this invention, the compositions of this invention are used in varying quantities. In general, the feed or water supply will be supplemented with from about 0.01% to about 0.15% by weight of the present compositions and, so supplemented, the feed or water is fed to the poultry ad libitum. In the preferred embodiment of this invention, the poultry feed or drinking water supply is supplemented with from about 0.01% to about 0.05% by weight of the present compositions. The regular ingestion of feed and drinking water so supplemented will promote the growth of the poultry and serve as a prophylaxis against coccidiosis. In the treatment of an already existing coccidiosis infection, the poultry are preferably fed a feed or drinking water supplemented with from about 0.01% to about 0.05% by weight, more preferably from about 0.012% to about 0.025% by weight, of the composition of this invention. Obviously, however, under some conditions it may be beneficial to supplement the feed or drinking water with a quantity of the compositions of this invention which is less or greater than that indicated heretofore. Furthermore, the compositions of this invention can be used to supplement feeds and feed premixes which contain other therapeutically active ingredients.

For a fuller understanding of the nature and objects of this invention, reference may be had to the following examples which are given merely as further illustrations of the invention and are not to be construed in a limiting sense.

EXAMPLE 1

In this example, a mixture was prepared containing 80.0 parts by weight of 5-methyl-3-sulfanilamidoisoxazole and 20.0 parts by weight of 2,4-diamino-5-(3,4-dimethoxybenzyl)-pyrimidine. The composition, thus obtained, was added to, and uniformly distributed throughout, the feed mix described hereinafter in a ratio of 100.0 mg. of the therapeutic combination per 1 kg. of feed.

| | Kg. |
|---|---|
| Maize meal | 118 |
| Barley meal | 50 |
| Soya meal | 55 |
| Codfish meal | 15 |
| Dried yeast | 4.5 |
| Calcium carbonate | 2.5 |
| Bonemeal | 2.5 |
| Cattle salt | 1.1 |
| Vitamin-and mineral-premix (containing vitamins A, $B_1$, $B_2$, $B_6$, $B_{12}$, $D_3$, E, K; calcium pantothenate; nicotinic acid; folic acid; biotin; choline; $Fe^{++}$; $Mn^{++}$; $Zn^{++}$; $Cu^{++}$; $Co^{++}$; $I^-$) | 1.4 |

A flock of 250 weighed two-week old chickens were fed the supplemented feed described in the preceding paragraph. For control purposes, a flock of 250 weighed two-week old chickens were fed the same feed, but in this instance, the feed was not supplemented with the therapeutic composition of this invention. The chickens were allowed to feed on the aforesaid ration for a period of eight days. At the end of that time the animals of each group were weighed.

The experiment was conducted also using the feed described heretofore supplemented with the therapeutic composition described heretofore, this experiment differing from the original in that 200 mg. of supplement was used for each 1 kg. of feed.

The results observed at the completion of this study are summarized in the table which follows:

| Percent of weight of active ingredient in feed | Average weight increase, percent |
|---|---|
| 0 (control group) | 60 |
| 0.01 | 70 |
| 0.02 | 90–100 |

Analogous results were obtained when chickens were fed a feed supplemented with a composition comprising 70% by weight of 5-methyl-3-sulfanilamidoisoxazole and 30% by weight of 2,4-diamino-5-(3,4-dimethoxybenzyl)-pyrimidine. Additionally, comparable results were obtained when the feed was supplemented with 150 mg./kg. of additive supplement and where the supplement comprised 60% by weight of 5-methyl-3-sulfanilamidoisoxazole and 40% by weight of 2,4-diamino-5-(3,4-dimethoxybenzyl)-pyrimidine.

EXAMPLE 2

This example is included herein to show the efficacy of the combination of 5-methyl-3-sulfanilamidoisoxazole and 2,4-diamino-5-(3,4-dimethoxybenzyl)-pyrimidine in treating coccidiosis.

In this example, a group comprising ten weighed two-week old chickens was fed a feed-mix containing, for each 1 kg. of feed-mix, 100 mg. of a product produced by mixing 80% by weight of 5-methyl-3-sulfanilamidoisoxazole and 20% by weight of 2,4-diamino-5-(3,4-dimethoxybenzyl)-pyrimidine. A second group comprising ten weighed two-week old chickens was fed the same feed-mix as the first, but in this instance the feed-mix was supplemented with 200 mg./kg. of the product produced by mixing 80% by weight of 5-methyl-3-sulfanilamidoisoxazole and 20% by weight of 2,4-diamino-5-(3,4-dimethoxybenzyl)-pyrimidine. Seventy-two hours after the commencement of the feeding of the therapeutically supplemented feed, each chicken in each of the two groups was infected, per os, with 100,000 sporulated oöcysts of *Eimeria tenella*.

For control purposes, a third group comprising ten weighed two-week old chickens was fed with the same feed-mix as was fed to the other two groups but, in this instance, the feed-mix was not supplemented with the therapeutically active composition of this invention. The chickens in the control group were also infected, per os, with 100,000 sporulated oöcysts.

The chickens were allowed to feed on their respective feed-mixes for a period of eight days. The surviving animals of the three groups were sacrificed, weighed and examined for pathological changes. The results of this experiment are compiled in the following table.

| Percent by weight of active ingredient in feed | Mortality, percent | Cecal damage |
|---|---|---|
| 0 (control group) | 70 | Severe. |
| 0.01 | 0 | Very slight. |
| 0.02 | 0 | None. |

Comparable results were obtained when the active ingredient in the feed comprised 70% by weight of 5-methyl-3-sulfanilamidoisoxazole and 30% by weight of 2,4-diamino-5-(3,4-dimethoxybenzyl)-pyrimidine. Furthermore, results, comparable to those set forth in the foregoing table, were obtained when an experiment was conducted using a feed-mix containing 150 mg./kg. of a composition comprising 60% by weight of 5-methyl-3-sulfanilamidoisoxazole and 40% by weight of 2,4-diamino-5-(3,4-dimethoxybenzyl)-pyrimidine.

EXAMPLE 3

This example is included herein to show the synergistic efficacy of various combinations of 5-methyl-3-sufanilamidoisoxazole and 2,4-diamino-5-(3,4-dimethoxybenzyl)-pyrimidine in treating coccidiosis.

In this example, groups of ten weighed two-week old chickens were fed a feed-mix containing for each kg. of feed mix 50 mg., 100 mg., 150 mg., 200 mg., and 300 mg., respectively, of 5-methyl-3-sulfanilamidoisoxazole, designated as Formulation I in the table of results. Additional groups of weighed two-week old chickens were fed a feed-mix containing, for each kg. of feed-mix, 50 mg., 125 mg., and 150 mg., respectively, of 2,4-diamino-5-(3,4-dimethoxybenzyl)pyrimidine, designated as Formulation II in the table of results. Additional groups of weighed two-week old chickens were fed feed-mix compositions containing various combinations of 5 - methyl-3-sulfanilamidoisoxazole and 2,4-diamino-5-(3,4-dimethoxybenzyl)-pyrimidine. The following table lists the feed-mix compositions utilized and the proportions of each active ingredient in each formulation.

FEED-MIX COMPOSITIONS

| Formulation No. | Percent of active ingredient of— | |
|---|---|---|
|  | 5-methyl-3-sulfanil-amido-isoxazole | 2,4-diamino-5-(3,4-dimethoxy benzyl)-pyrimidine |
| III | ¹70 | ¹30 |
| IV | 75 | 25 |
| V | 80 | 20 |
| VI | 90 | 10 |

¹ In this formulation, a sufficient amount of the sodium salt of 5-methyl-3-sulfanilamidoisoxazole and 2,4-diamino-5-(3,4-dimethoxybenzyl) - pyrimidine hydrochloride were utilized to provide the desired amount of free base.

Seventy two hours after the commencement of the feeding of the therapeutically supplemented feed, each chicken in the foregoing groups was infected, per os, with 100,000 sporulated oöcysts of *Eimeria tenella*.

For control purposes, a group comprising ten weighed two-week old chickens was fed with the same feed-mix as was fed to the other groups, but the feed mix was not supplemented with the therapeutically active compound(s) as described above. The chickens in this group were also infected, per os, with 100,000 sporulated oöcysts of *Eimeria tenella*.

The chickens were allowed to feed on their respective feed-mixes for a period of eight days. The surviving birds of the above groups were sacrificed, weighed and examined for pathological changes. The results of these experiments are compiled in the following table:

| Formulation No. | Percent by weight active ingredient in feed | Mortality, percent | Cecal damage |
|---|---|---|---|
| Control | 0 | 70 | Severe. |
| I | 0.0050 | 35 | Considerable. |
|  | 0.0100 | 30 | Do. |
|  | 0.0150 | 30 | Do. |
|  | 0.0200 | 10 | Do. |
|  | 0.0300 | 0 | None. |
| II | 0.0050 | 20 | Considerable. |
|  | 0.0125 | 0 | Medium. |
|  | 0.0150 | 0 | Weak. |
| III | 0.0100 | 0 | Very slight. |
|  | 0.0125 | 0 | None. |
|  | 0.0150 | 0 | Do. |
|  | 0.0200 | 0 | Do. |
| IV | 0.0100 | 0 | Very slight. |
|  | 0.0125 | 0 | Do. |
|  | 0.0150 | 0 | Do. |
|  | 0.0200 | 0 | Do. |
| V | 0.0100 | 0 | Slight. |
|  | 0.0125 | 0 | Very slight. |
|  | 0.0150 | 0 | None. |
|  | 0.0200 | 0 | Do. |
| VI | 0.0100 | 0 | Slight. |
|  | 0.0125 | 0 | Very slight. |
|  | 0.0150 | 0 | None. |
|  | 0.0200 | 0 | Do. |

We claim:

1. A coccidiostatic and growth promoting composition comprising (a) from about 70 percent to about 90 percent by weight, based upon the free base, of a member selected from the group consisting of 5-methyl-3-sulfanilamidoisoxazole and an alkali metal salt thereof and (b) from about 10 percent to about 30 percent by weight, based upon the free base, of a member selected from the group consisting of 2,4-diamino-5-(3,4-dimethoxybenzyl) pyrimidine and an acid addition salt thereof.

2. The composition of claim 1 in admixture with poultry feed, said composition being present in said mixture in a concentration of from about 0.01% to about 0.15% by weight.

3. The composition of claim 1 in admixture with poultry feed, said composition being present in said mixture in a concentration of from about 0.01% to about 0.05% by weight.

References Cited

UNITED STATES PATENTS

| 2,823,160 | 2/1958 | Lux et al. | 424—251 |
| 3,085,937 | 4/1963 | Hirayama et al. | 424—229 |

OTHER REFERENCES

Goldberg, Antibiotics, Their Chemistry and New Medical Uses (pp. 71–177), Ch. III—T. O. Luckey.

ALBERT T. MEYERS, Primary Examiner

L. SCHENKMAN, Assistant Examiner

U.S. Cl. X.R.

424—251

PO-1050
(5/69)

UNITED STATES PATENT OFFICE
CERTIFICATE OF CORRECTION

Patent No. __3,737,534__     Dated __June 5, 1973__

Inventor(s) __Hans Thommen and Harald Weiser__

It is certified that error appears in the above-identified patent and that said Letters Patent are hereby corrected as shown below:

In the Title Paragraph the Assignee and Claim for Right of Priority are omitted

Please insert after Arlesheim, Switzerland

Assignors to  Hoffmann-La Roche Inc., Nutley, New Jersey, a corporation of New Jersey Signed and sealed this 19th day of March 1974.

(SEAL)
Attest:

EDWARD M. FLETCHER, JR.
Attesting Officer

C. MARSHALL DANN
Commissioner of Patents

PO-1050
(5/69)

UNITED STATES PATENT OFFICE
CERTIFICATE OF CORRECTION

Patent No. 3,737,534      Dated February 26, 1974

Inventor(s) Hans Thommen and Harald Weiser

It is certified that error appears in the above-identified patent and that said Letters Patent are hereby corrected as shown below:

In the Title Paragraph the Claim for Right of Priority is omitted

Please insert after Serial No. 884,332

Claims Priority, applications Switzerland February 15, 1966, 2,179/66 and 2,180/66.

Signed and sealed this 27th day of August 1974.

(SEAL)
Attest:

McCOY M. GIBSON, JR.
Attesting Officer

C. MARSHALL DANN
Commissioner of Patents